United States Patent
Nijim

(10) Patent No.: US 9,167,302 B2
(45) Date of Patent: Oct. 20, 2015

(54) PLAYLIST BOOKMARKING

(75) Inventor: Yousef Wasef Nijim, Roswell, GA (US)

(73) Assignee: Cox Communications, Inc., Atlanta, GA (US)

( * ) Notice: Subject to any disclaimer, the term of this patent is extended or adjusted under 35 U.S.C. 154(b) by 487 days.

(21) Appl. No.: 12/868,824

(22) Filed: Aug. 26, 2010

(65) Prior Publication Data

US 2012/0054808 A1    Mar. 1, 2012

(51) Int. Cl.
*H04H 60/33*    (2008.01)
*H04N 21/472*    (2011.01)
*H04N 21/41*    (2011.01)
*H04N 21/482*    (2011.01)

(52) U.S. Cl.
CPC ..... *H04N 21/47214* (2013.01); *H04N 21/4126* (2013.01); *H04N 21/47202* (2013.01); *H04N 21/4825* (2013.01)

(58) Field of Classification Search
CPC .................... H04N 21/4126; H04N 21/41407; H04N 21/44222
See application file for complete search history.

(56) References Cited

U.S. PATENT DOCUMENTS

| | | | |
|---|---|---|---|
| 5,565,909 A | 10/1996 | Thibadeau et al. | |
| 5,583,560 A | 12/1996 | Florin et al. | |
| 5,808,662 A | 9/1998 | Kinney et al. | |
| 5,812,123 A | 9/1998 | Rowe et al. | |
| 5,818,439 A | 10/1998 | Nagasaka et al. | |
| 5,861,906 A | 1/1999 | Dunn et al. | |
| 6,144,375 A | 11/2000 | Jain et al. | |
| 6,173,317 B1 | 1/2001 | Chaddha et al. | |
| 6,188,398 B1 * | 2/2001 | Collins-Rector et al. | ....... 725/37 |
| 6,282,713 B1 | 8/2001 | Kitsukawa et al. | |
| 6,438,579 B1 | 8/2002 | Hosken | |
| 6,615,248 B1 | 9/2003 | Smith | |
| 6,754,904 B1 | 6/2004 | Cooper et al. | |
| 6,934,963 B1 | 8/2005 | Reynolds et al. | |
| 6,968,364 B1 | 11/2005 | Wong et al. | |
| 6,983,426 B1 | 1/2006 | Kobayashi et al. | |
| 7,017,173 B1 | 3/2006 | Armstrong et al. | |
| 7,080,139 B1 | 7/2006 | Briggs et al. | |
| 7,228,305 B1 * | 6/2007 | Eyal et al. | .............................. 1/1 |
| 7,246,367 B2 | 7/2007 | Livonen | |
| 7,249,366 B1 | 7/2007 | Flavin | |
| 7,272,844 B1 | 9/2007 | Bankers et al. | |
| 7,290,211 B2 | 10/2007 | Goodwin et al. | |

(Continued)

FOREIGN PATENT DOCUMENTS

JP    2002-218428    8/2002

OTHER PUBLICATIONS

U.S. Office Action dated Apr. 26, 2011 cited in U.S. Appl. No. 12/126,096.

(Continued)

*Primary Examiner* — Pankaj Kumar
*Assistant Examiner* — Timothy Newlin
(74) *Attorney, Agent, or Firm* — Merchant & Gould P.C.

(57) ABSTRACT

Playlist bookmarking may be provided. First, a content program from a playlist may be displayed on a first user device. The content program may then be paused and a time stamp may be placed in the playlist at a point where the content program was paused. Next, the time stamped playlist may be transmitted to a server. At a second user device, the time stamped playlist may be received from the server and the content program may be displayed from the playlist from the point in the content program corresponding to the time stamp.

18 Claims, 3 Drawing Sheets

(56) References Cited

U.S. PATENT DOCUMENTS

| | | | |
|---|---|---|---|
| 7,363,644 | B2 | 4/2008 | Wugofski |
| 7,584,214 | B2 | 9/2009 | Narahara et al. |
| 7,596,761 | B2 | 9/2009 | Lemay et al. |
| 7,669,219 | B2 | 2/2010 | Scott, III |
| 7,673,315 | B1 | 3/2010 | Wong et al. |
| 7,685,204 | B2 | 3/2010 | Rogers |
| 7,698,263 | B2 | 4/2010 | Pickelsimer et al. |
| 7,716,376 | B1 | 5/2010 | Price et al. |
| 7,877,293 | B2 | 1/2011 | Biebesheimer et al. |
| 7,886,327 | B2 * | 2/2011 | Stevens ................ 725/105 |
| 7,895,625 | B1 | 2/2011 | Bryan et al. |
| 7,904,924 | B1 | 3/2011 | de Heer et al. |
| 7,933,789 | B2 | 4/2011 | Boland et al. |
| 7,992,163 | B1 | 8/2011 | Jerding et al. |
| 8,090,606 | B2 | 1/2012 | Svendsen |
| 8,091,032 | B2 | 1/2012 | Fischer |
| 8,220,021 | B1 | 7/2012 | Look et al. |
| 8,296,660 | B2 | 10/2012 | Macadaan et al. |
| 8,296,803 | B2 | 10/2012 | Yamaoka et al. |
| 8,364,013 | B2 | 1/2013 | Nijim |
| 8,418,204 | B2 | 4/2013 | Pickelsimer et al. |
| 8,789,102 | B2 | 7/2014 | Pickelsimer et al. |
| 8,789,117 | B2 | 7/2014 | Nijim |
| 8,806,532 | B2 | 8/2014 | Pickelsimer et al. |
| 8,832,749 | B2 | 9/2014 | Pickelsimer et al. |
| 8,869,191 | B2 | 10/2014 | Pickelsimer et al. |
| 8,973,049 | B2 | 3/2015 | Pickelsimer et al. |
| 9,071,729 | B2 | 6/2015 | Pickelsimer et al. |
| 2001/0001160 | A1 | 5/2001 | Shoff et al. |
| 2001/0037367 | A1 | 11/2001 | Iyer |
| 2002/0007485 | A1 | 1/2002 | Rodriguez et al. |
| 2002/0056123 | A1 | 5/2002 | Liwerant et al. |
| 2002/0057297 | A1 | 5/2002 | Grimes et al. |
| 2002/0069218 | A1 | 6/2002 | Sull et al. |
| 2002/0087982 | A1 | 7/2002 | Stuart |
| 2002/0120757 | A1 | 8/2002 | Sutherland et al. |
| 2002/0124252 | A1 | 9/2002 | Schaefer et al. |
| 2002/0128831 | A1 | 9/2002 | Ju et al. |
| 2002/0144273 | A1 | 10/2002 | Reto |
| 2002/0156852 | A1 | 10/2002 | Hughes et al. |
| 2002/0174430 | A1 | 11/2002 | Ellis et al. |
| 2002/0194195 | A1 | 12/2002 | Fenton et al. |
| 2002/0199188 | A1 | 12/2002 | Sie et al. |
| 2003/0002849 | A1 | 1/2003 | Lord |
| 2003/0021582 | A1 | 1/2003 | Sawada |
| 2003/0084449 | A1 | 5/2003 | Chane et al. |
| 2003/0093790 | A1 * | 5/2003 | Logan et al. ................. 725/38 |
| 2003/0093806 | A1 | 5/2003 | Dureau et al. |
| 2003/0112467 | A1 | 6/2003 | McCollum et al. |
| 2003/0115592 | A1 | 6/2003 | Johnson |
| 2003/0154477 | A1 | 8/2003 | Hassell et al. |
| 2003/0156827 | A1 | 8/2003 | Janevski |
| 2003/0177497 | A1 | 9/2003 | Macrae et al. |
| 2003/0206710 | A1 | 11/2003 | Ferman et al. |
| 2003/0208763 | A1 | 11/2003 | McElhatten et al. |
| 2003/0220100 | A1 | 11/2003 | McElhatten et al. |
| 2003/0225846 | A1 | 12/2003 | Heikes et al. |
| 2003/0229900 | A1 | 12/2003 | Reisman |
| 2004/0034867 | A1 | 2/2004 | Rashkovskiy et al. |
| 2004/0060063 | A1 | 3/2004 | Russ et al. |
| 2004/0078807 | A1 | 4/2004 | Fries et al. |
| 2004/0078814 | A1 | 4/2004 | Allen |
| 2004/0103167 | A1 | 5/2004 | Grooters et al. |
| 2004/0117786 | A1 | 6/2004 | Kellerman et al. |
| 2004/0210928 | A1 | 10/2004 | Hamzy et al. |
| 2004/0255336 | A1 | 12/2004 | Logan et al. |
| 2004/0255340 | A1 | 12/2004 | Logan |
| 2004/0268386 | A1 | 12/2004 | Logan et al. |
| 2005/0022241 | A1 | 1/2005 | Griggs |
| 2005/0028208 | A1 | 2/2005 | Ellis et al. |
| 2005/0044565 | A1 | 2/2005 | Jerding et al. |
| 2005/0055710 | A1 | 3/2005 | Aoki et al. |
| 2005/0076363 | A1 | 4/2005 | Dukes et al. |
| 2005/0091316 | A1 | 4/2005 | Ponce et al. |
| 2005/0149880 | A1 | 7/2005 | Postrel |
| 2005/0210145 | A1 | 9/2005 | Kim et al. |
| 2005/0246739 | A1 | 11/2005 | Davidson |
| 2005/0246752 | A1 | 11/2005 | Liwerant et al. |
| 2005/0251820 | A1 | 11/2005 | Stefanik et al. |
| 2005/0262542 | A1 | 11/2005 | DeWeese et al. |
| 2005/0278443 | A1 | 12/2005 | Winner et al. |
| 2005/0278740 | A1 | 12/2005 | Helms |
| 2005/0278761 | A1 * | 12/2005 | Gonder et al. ................ 725/95 |
| 2005/0283813 | A1 | 12/2005 | Jamail et al. |
| 2006/0005207 | A1 | 1/2006 | Louch et al. |
| 2006/0008256 | A1 * | 1/2006 | Khedouri et al. ............ 386/124 |
| 2006/0020904 | A1 | 1/2006 | Aaltonen et al. |
| 2006/0031882 | A1 | 2/2006 | Swix et al. |
| 2006/0041927 | A1 | 2/2006 | Stark et al. |
| 2006/0059514 | A1 | 3/2006 | Hsiao et al. |
| 2006/0059526 | A1 * | 3/2006 | Poslinski ................ 725/88 |
| 2006/0075019 | A1 | 4/2006 | Donovan et al. |
| 2006/0080408 | A1 | 4/2006 | Istvan et al. |
| 2006/0090183 | A1 | 4/2006 | Zito et al. |
| 2006/0112325 | A1 | 5/2006 | Ducheneaut et al. |
| 2006/0130093 | A1 | 6/2006 | Feng et al. |
| 2006/0143236 | A1 | 6/2006 | Wu |
| 2006/0161950 | A1 | 7/2006 | Imai et al. |
| 2006/0174277 | A1 | 8/2006 | Sezan et al. |
| 2006/0184972 | A1 | 8/2006 | Rafey et al. |
| 2006/0190966 | A1 | 8/2006 | McKissick et al. |
| 2006/0195479 | A1 | 8/2006 | Spiegelman et al. |
| 2006/0239131 | A1 * | 10/2006 | Nathan et al. ............ 369/30.06 |
| 2006/0248557 | A1 | 11/2006 | Stark et al. |
| 2006/0253874 | A1 | 11/2006 | Stark et al. |
| 2006/0259926 | A1 | 11/2006 | Scheelke et al. |
| 2006/0271959 | A1 | 11/2006 | Jacoby et al. |
| 2006/0282856 | A1 | 12/2006 | Errico et al. |
| 2007/0033533 | A1 | 2/2007 | Sull |
| 2007/0061835 | A1 * | 3/2007 | Klein et al. ................ 725/25 |
| 2007/0106627 | A1 | 5/2007 | Srivastava et al. |
| 2007/0123353 | A1 | 5/2007 | Smith |
| 2007/0124795 | A1 | 5/2007 | McKissick et al. |
| 2007/0150918 | A1 | 6/2007 | Carpenter et al. |
| 2007/0186180 | A1 | 8/2007 | Morgan |
| 2007/0186231 | A1 | 8/2007 | Haeuser et al. |
| 2007/0186243 | A1 | 8/2007 | Pettit et al. |
| 2007/0198532 | A1 | 8/2007 | Krikorian et al. |
| 2007/0204238 | A1 | 8/2007 | Hua et al. |
| 2007/0214473 | A1 | 9/2007 | Barton et al. |
| 2007/0220552 | A1 * | 9/2007 | Juster et al. ................ 725/46 |
| 2007/0220566 | A1 | 9/2007 | Ahmad-Taylor |
| 2007/0245367 | A1 | 10/2007 | Ogawa |
| 2007/0256103 | A1 | 11/2007 | Knudson |
| 2007/0271338 | A1 | 11/2007 | Anschutz |
| 2007/0277205 | A1 | 11/2007 | Grannan |
| 2007/0282949 | A1 | 12/2007 | Fischer et al. |
| 2007/0294726 | A1 | 12/2007 | Drazin |
| 2007/0298401 | A1 | 12/2007 | Mohanty et al. |
| 2008/0010153 | A1 | 1/2008 | Pugh-O'Connor et al. |
| 2008/0022320 | A1 | 1/2008 | Ver Steeg |
| 2008/0036917 | A1 | 2/2008 | Pascarella et al. |
| 2008/0040370 | A1 | 2/2008 | Bosworth et al. |
| 2008/0052371 | A1 | 2/2008 | Partovi et al. |
| 2008/0065758 | A1 | 3/2008 | Narayanaswami |
| 2008/0066111 | A1 | 3/2008 | Ellis et al. |
| 2008/0066114 | A1 | 3/2008 | Carlson et al. |
| 2008/0082606 | A1 | 4/2008 | Gupta et al. |
| 2008/0086456 | A1 | 4/2008 | Rasanen et al. |
| 2008/0092168 | A1 | 4/2008 | Logan et al. |
| 2008/0098323 | A1 | 4/2008 | Vallone et al. |
| 2008/0114861 | A1 | 5/2008 | Gildred |
| 2008/0126936 | A1 | 5/2008 | Williams |
| 2008/0137756 | A1 | 6/2008 | Scherlis et al. |
| 2008/0155600 | A1 | 6/2008 | Klappert et al. |
| 2008/0163307 | A1 | 7/2008 | Coburn et al. |
| 2008/0168506 | A1 | 7/2008 | Pickelsimer et al. |
| 2008/0168515 | A1 | 7/2008 | Benson et al. |
| 2008/0177727 | A1 | 7/2008 | Pickelsimer et al. |
| 2008/0178218 | A1 | 7/2008 | Pickelsimer et al. |
| 2008/0235733 | A1 * | 9/2008 | Heie et al. ................ 725/46 |
| 2008/0247730 | A1 | 10/2008 | Barton et al. |
| 2008/0256129 | A1 * | 10/2008 | Salinas et al. ................ 707/104.1 |
| 2008/0263595 | A1 | 10/2008 | Sumiyoshi et al. |

(56) References Cited

U.S. PATENT DOCUMENTS

| | | | |
|---|---|---|---|
| 2008/0276278 A1 | 11/2008 | Krieger et al. | |
| 2008/0288596 A1 | 11/2008 | Smith et al. | |
| 2008/0313541 A1 | 12/2008 | Shafton et al. | |
| 2008/0320139 A1* | 12/2008 | Fukuda et al. | 709/226 |
| 2009/0019374 A1 | 1/2009 | Logan et al. | |
| 2009/0044216 A1 | 2/2009 | McNicoll | |
| 2009/0049098 A1 | 2/2009 | Pickelsimer et al. | |
| 2009/0049118 A1 | 2/2009 | Stevens | |
| 2009/0049473 A1 | 2/2009 | Pickelsimer et al. | |
| 2009/0055743 A1 | 2/2009 | Pickelsimer et al. | |
| 2009/0055868 A1 | 2/2009 | Wehmeyer et al. | |
| 2009/0063994 A1 | 3/2009 | Pickelsimer et al. | |
| 2009/0094643 A1 | 4/2009 | Pickelsimer et al. | |
| 2009/0100469 A1 | 4/2009 | Conradt et al. | |
| 2009/0125843 A1 | 5/2009 | Billmaier et al. | |
| 2009/0162024 A1 | 6/2009 | Bradicich et al. | |
| 2009/0172127 A1 | 7/2009 | Srikanth et al. | |
| 2009/0172543 A1 | 7/2009 | Cronin et al. | |
| 2009/0178081 A1 | 7/2009 | Goldenberg et al. | |
| 2009/0199242 A1 | 8/2009 | Johnson et al. | |
| 2009/0307719 A1 | 12/2009 | Clark et al. | |
| 2009/0310933 A1 | 12/2009 | Lee | |
| 2009/0313664 A1 | 12/2009 | Patil et al. | |
| 2010/0042746 A1* | 2/2010 | Keum et al. | 709/245 |
| 2010/0064320 A1 | 3/2010 | Angiolillo et al. | |
| 2010/0107194 A1 | 4/2010 | McKissick et al. | |
| 2010/0175084 A1 | 7/2010 | Ellis et al. | |
| 2010/0192173 A1 | 7/2010 | Mizuki et al. | |
| 2010/0263011 A1 | 10/2010 | McMurtrie | |
| 2011/0010744 A1 | 1/2011 | Stecyk et al. | |
| 2011/0013885 A1 | 1/2011 | Wong et al. | |
| 2011/0072455 A1 | 3/2011 | Pickelsimer et al. | |
| 2011/0090402 A1 | 4/2011 | Huntington et al. | |
| 2011/0107389 A1 | 5/2011 | Chakarapani | |
| 2011/0131600 A1 | 6/2011 | Howcroft et al. | |
| 2011/0138423 A1 | 6/2011 | Pickelsimer et al. | |
| 2011/0202945 A1 | 8/2011 | Pickelsimer et al. | |
| 2011/0283313 A1* | 11/2011 | Gathen et al. | 725/37 |
| 2012/0051717 A1 | 3/2012 | Nijim | |
| 2012/0054810 A1 | 3/2012 | Nijim | |
| 2012/0222056 A1* | 8/2012 | Donoghue et al. | 725/5 |
| 2012/0284744 A1* | 11/2012 | Kumar | 725/34 |
| 2013/0167168 A1 | 6/2013 | Ellis et al. | |
| 2014/0242285 A1* | 8/2014 | Pettersson et al. | 427/427.2 |

OTHER PUBLICATIONS

Copending U.S. Appl. No. 12/868,801, filed Aug. 26, 2010 entitled "Playlist Bookmarking".
Copending U.S. Appl. No. 12/868,838, filed Aug. 26, 2010 entitled "Content Bookmarking".
J. Bouwen et al., "Community Meets Entertainment: Community Television," Technology White Paper, Alcatel Telecommunications Review, 1st Quarter 2005, pp. 1-8, http://www.alcatel.com/doctypes/articlespaperlibrary/pdf/ATR2005QI/T0503-Community_TV-EN.pdf.
U.S. Office Action dated Mar. 26, 2012 cited in U.S. Appl. No. 12/126,060, 26 pgs.
U.S. Office Action dated Sep. 13, 2012 cited in U.S. Appl. No. 11/651,140, 23 pgs.
U.S. Office Action dated Oct. 4, 2012 cited in U.S. Appl. No. 12/868,801, 27 pgs.
U.S. Office Action dated Oct. 5, 2012 cited in U.S. Appl. No. 12/959,793, 31 pgs.
U.S. Office Action dated Oct. 9, 2012 cited in U.S. Appl. No. 12/545,099, 21 pgs.
U.S. Final Office Action dated Oct. 9, 2012 cited in U.S. Appl. No. 12/959,731, 19 pgs.
U.S. Office Action dated Oct. 24, 2012 cited in U.S. Appl. No. 12/126,165, 25 pgs.
U.S. Final Office Action dated May 31, 2012 cited in U.S. Appl. No. 12/126,165, 23 pgs.
U.S. Office Action dated Jun. 5, 2012 cited in U.S. Appl. No. 12/126,126, 40 pgs.
U.S. Office Action dated Jun. 20, 2012 cited in U.S. Appl. No. 12/959,731, 30 pgs.
Copending U.S. Appl. No. 12/868,801, filed Aug. 26, 2010 entitled "Content Library".
U.S. Office Action dated Apr. 28, 2009 cited in U.S. Appl. No. 11/787,733.
U.S. Office Action dated Jun. 22, 2009 cited in U.S. Appl. No. 11/787,732.
U.S. Final Office Action dated Dec. 30, 2009 cited in U.S. Appl. No. 11/787,732.
U.S. Office Action dated Sep. 14, 2010 cited in U.S. Appl. No. 11/651,140.
U.S. Office Action dated Sep. 14, 2010 cited in U.S. Appl. No. 11/787,732.
U.S. Final Office Action dated Aug. 5, 2011 cited in U.S. Appl. No. 12/545,099.
U.S. Final Office Action dated Sep. 27, 2011 cited in U.S. Appl. No. 11/651,140.
U.S. Office Action dated Jun. 7, 2011 cited in U.S. Appl. No. 11/651,140.
U.S. Final Office Action dated Jun. 13, 2011 cited in U.S. Appl. No. 12/126,060.
U.S. Final Office Action dated Jun. 21, 2011 cited in U.S. Appl. No. 12/126,025.
U.S. Appl. No. 13/221,151, filed Aug. 30, 2011 entitled "Sharing Digitally Recorded Content".
U.S. Final Office Action dated Sep. 29, 2011 cited in U.S. Appl. No. 12/126,096.
U.S. Office Action dated Dec. 28, 2011 cited in U.S. Appl. No. 12/545,099, 13 pgs.
U.S. Office Action dated Jan. 5, 2012 cited in U.S. Appl. No. 12/126,096, 20 pgs.
U.S. Office Action dated Feb. 14, 2011 cited in U.S. Appl. No. 12/126,025.
U.S. Office Action dated Feb. 17, 2011 cited in U.S. Appl. No. 12/126,060.
U.S. Office Action dated Feb. 18, 2011 cited in U.S. Appl. No. 12/545,099.
U.S. Office Action dated Feb. 28, 2011 cited in U.S. Appl. No. 11/651,140.
U.S. Final Office Action dated Mar. 2, 2011 cited in U.S. Appl. No. 11/787,732.
U.S. Final Office Action dated Mar. 2, 2011 cited in U.S. Appl. No. 12/126,165.
U.S. Final Office Action dated Apr. 20, 2012 cited in U.S. Appl. No. 12/126,096, 25 pgs.
U.S. Final Office Action dated Apr. 25, 2012 cited in U.S. Appl. No. 12/545,099, 16 pgs.
U.S. Final Office Action dated Apr. 25, 2012 cited in U.S. Appl. No. 11/651,140, 21 pgs.
U.S. Office Action dated May 21, 2012 cited in U.S. Appl. No. 12/868,838, 22 pgs.
Copending U.S. Appl. No. 12/959,731, filed Dec. 3, 2010 entitled "Providing a Media Guide Including Parental Information".
Copending U.S. Appl. No. 12/959,665, filed Dec. 3, 2010 entitled "Content Recommendations".
Copending U.S. Appl. No. 12/959,793, filed Dec. 3, 2010 entitled "Personalizing TV Content".
U.S. Final Office Action dated Jan. 14, 2011 cited in U.S. Appl. No. 12/126,096.
U.S. Office Action dated Jan. 18, 2012 cited in U.S. Appl. No. 12/126,025, 27 pgs.
U.S. Office Action dated Jan. 19, 2012 cited in U.S. Appl. No. 12/126,165, 20 pgs.
U.S. Office Action dated Jan. 19, 2012 cited in U.S. Appl. No. 11/651,140, 21 pgs.
U.S. Final Office Action dated Dec. 22, 2010 cited in U.S. Appl. No. 11/651,140.
U.S. Final Office Action dated Aug. 15, 2012 cited in U.S. Appl. No. 12/126,025, 33 pgs.

(56) References Cited

OTHER PUBLICATIONS

U.S. Final Office Action dated Aug. 23, 2012 cited in U.S. Appl. No. 12/126,060, 30 pgs.
U.S. Final Office Action dated Aug. 29, 2012 cited in U.S. Appl. No. 12/868,838, 7 pgs.
U.S. Office Action dated Sep. 30, 2010 cited in U.S. Appl. No. 12/126,165.
U.S. Office Action dated Oct. 5, 2010 cited in U.S. Appl. No. 12/126,096.
U.S. Office Action dated Dec. 19, 2012 cited in U.S. Appl. No. 12/126,025, 30 pgs.
U.S. Final Office Action dated Dec. 28, 2012 cited in U.S. Appl. No. 12/126,126, 24 pgs.
U.S. Office Action dated Nov. 5, 2012 cited in U.S. Appl. No. 12/126,096, 23 pgs.
U.S. Office Action dated Nov. 20, 2012 cited in U.S. Appl. No. 13/221,151, 29 pgs.
U.S. Office Action dated Aug. 21, 2013 cited in U.S. Appl. No. 12/126,096, 23 pgs.
U.S. Office Action dated Sep. 9, 2013 cited in U.S. Appl. No. 13/221,151, 16 pgs.
U.S. Final Office Action dated Aug. 1, 2013 cited in U.S. Appl. No. 12/959,731, 23 pgs.
U.S. Final Office Action dated Aug. 14, 2013 cited in U.S. Appl. No. 12/959,665, 30 pgs.
U.S. Office Action dated Aug. 16, 2013 cited in U.S. Appl. No. 12/868,801, 13 pgs.
U.S. Office Action dated May 22, 2013 cited in U.S. Appl. No. 11/651,140, 20 pgs.
U.S. Office Action dated Jun. 20, 2013 cited in U.S. Appl. No. 12/126,126, 27 pgs.
U.S. Final Office Action dated Feb. 26, 2013 cited in U.S. Appl. No. 11/651,140, 21 pgs.
U.S. Final Office Action dated Mar. 1, 2013 cited in U.S. Appl. No. 13/221,151, 15 pgs.
U.S. Final Office Action dated Mar. 27, 2013 cited in U.S. Appl. No. 12/126,096, 25 pgs.
U.S. Office Action dated Apr. 3, 2013 cited in U.S. Appl. No. 12/959,665, 45 pgs.
U.S. Final Office Action dated Apr. 10, 2013 cited in U.S. Appl. No. 12/959,793, 23 pgs.
U.S. Office Action dated Apr. 11, 2013 cited in U.S. Appl. No. 12/959,731, 22 pgs.
U.S. Final Office Action dated Apr. 11, 2013 cited in U.S. Appl. No. 12/126,025, 28 pgs.
U.S. Final Office Action dated Apr. 25, 2013 cited in U.S. Appl. No. 12/126,165, 26 pgs.
U.S. Final Office Action dated Apr. 30, 2013 cited in U.S. Appl. No. 12/868,801, 13 pgs.
U.S. Final Office Action dated May 3, 2013 cited in U.S. Appl. No. 12/545,099, 20 pgs.
U.S. Final Office Action dated Dec. 24, 2013 cited in U.S. Appl. No. 13/221,151, 17 pgs.
U.S. Final Office Action dated Jan. 9, 2014 cited in U.S. Appl. No. 12/126,096, 26 pgs.
U.S. Office Action dated Oct. 4, 2013 cited in U.S. Appl. No. 12/126,165, 28 pgs.
U.S. Office Action dated Oct. 7, 2013 cited in U.S. Appl. No. 12/959,793, 27 pgs.
U.S. Final Office Action dated Oct. 10, 2013 cited in U.S. Appl. No. 12/126,126, 23 pgs.
U.S. Final Office Action dated Oct. 28, 2013 cited in U.S. Appl. No. 11/651,140, 19 pgs.
U.S. Office Action dated Oct. 29, 2013 cited in U.S. Appl. No. 12/126,060, 27 pgs.
U.S. Final Office Action dated Apr. 3, 2014 cited in U.S. Appl. No. 12/126,060, 18 pgs.
U.S. Office Action dated May 20, 2014 cited in U.S. Appl. No. 12/126,096, 19 pgs.
U.S. Office Action dated May 21, 2014 cited in U.S. Appl. No. 13/221,151, 18 pgs.
U.S. Office Action dated Aug. 5, 2014 cited in U.S. Appl. No. 12/126,060, 23 pgs.
U.S. Office Action dated Mar. 6, 2014 cited in U.S. Appl. No. 12/959,731, 16 pgs.
U.S. Office Action dated Mar. 18, 2014 cited in U.S. Appl. No. 11/651,140, 18 pgs.
U.S. Final Office Action dated Nov. 21, 2014 cited in U.S. Appl. No. 12/126,060, 33 pgs.
U.S. Final Office Action dated Aug. 27, 2014 cited in U.S. Appl. No. 12/126,096, 38 pgs.
U.S. Final Office Action dated Sep. 3, 2014 cited in U.S. Appl. No. 13/221,151, 31 pgs.
U.S. Office Action dated Mar. 4, 2015 cited in U.S. Appl. No. 13/221,151, 26 pgs.
U.S. Office Action dated May 28, 2015 cited in U.S. Appl. No. 12/126,096, 46 pgs.
U.S. Final Office Action dated Jun. 19, 2015 cited in U.S. Appl. No. 13/221,151, 21 pgs.

\* cited by examiner

PLAYLIST BOOKMARKING

BACKGROUND

As music storage and playback using personal computers became common, the term "playlist" has been adopted by various media player software programs intended to organize and control music or video on a computer. Such playlists may be defined, stored, and selected to run either in sequence or, if a random playlist function is selected, in a random order. Playlists' uses include allowing a particular desired musical or video atmosphere to be created and maintained without constant user interaction, or to allow a variety of different styles of music and video to be played without maintenance.

SUMMARY

Playlist bookmarking may be provided. First, a content program from a playlist may be displayed on a first user device. The content program may then be paused and a time stamp may be placed in the playlist at a point where the content program was paused. Next, the time stamped playlist may be transmitted to a server. At a second user device, the time stamped playlist may be received from the server and the content program may be displayed from the playlist from the point in the content program corresponding to the time stamp.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
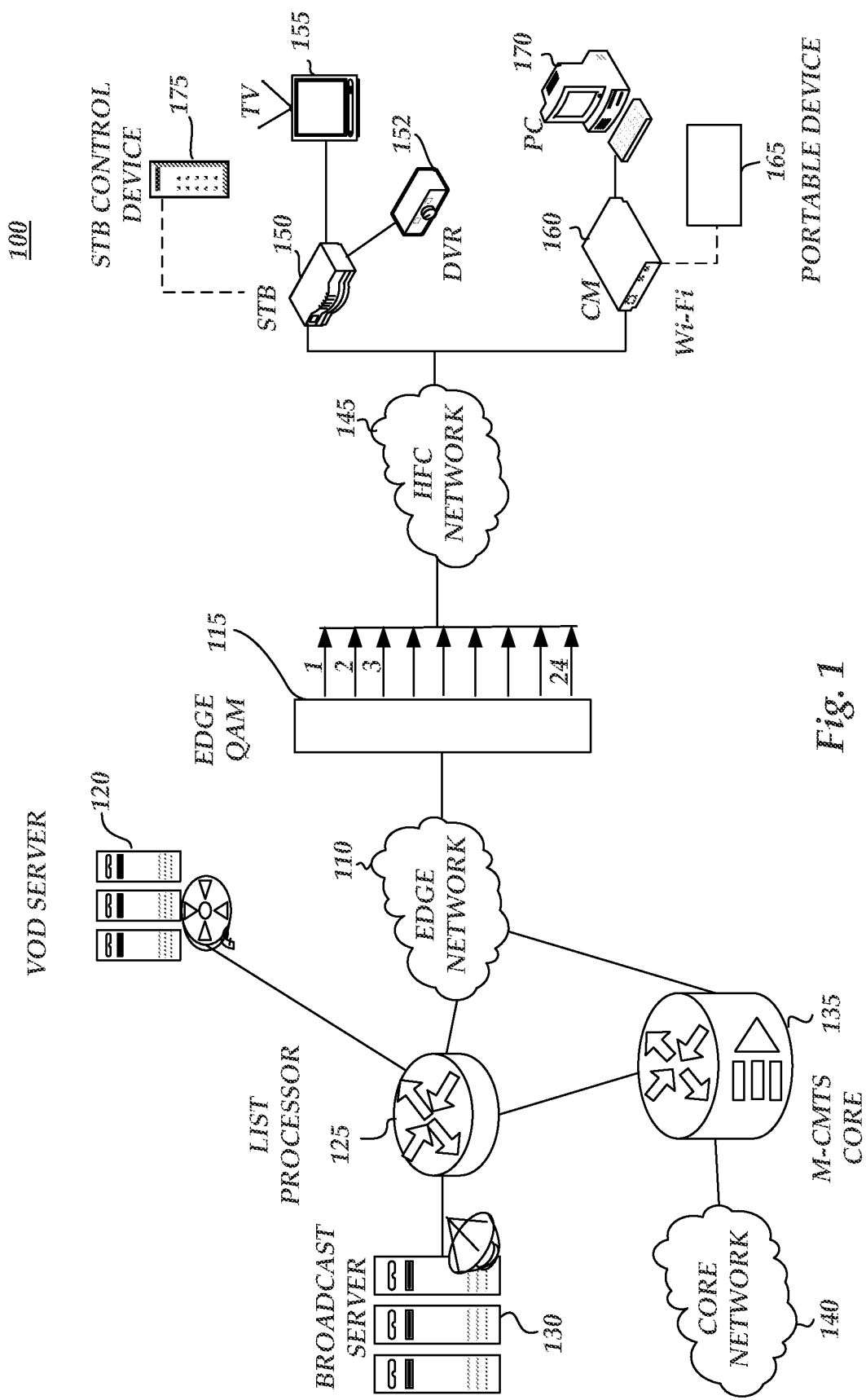
FIG. 1 is a block diagram of an operating environment including a list processor.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Service providers may deliver content programs to users (e.g. customers) over a content delivery system. The content programs may be delivered, for example, over a plurality of content channels (e.g. linear TV) or via video on demand (VOD) that a user may select among using a user device, for example, a set-top box (STB), a personal computer (PC), or a mobile device. The user may use playlists in consuming content from the content delivery system. While using the playlists, the user may bookmark the playlist while playing or watching programs in the playlist. Consistent with embodiments of the invention, for any program, the user may be able to stop or pause and, at a later time, watch the same program from the point at which the program was stopped or paused within the playlist. The user may be able to bookmark the playlist while the user is playing assets (e.g. content programs) from any platform (e.g. a STB, a PC, mobile device, etc.)

Consistent with embodiments of the invention, the user may be able to bookmark a playlist and store the bookmark for later viewing. If the user creates a playlist on the STB (or PC, mobile device, etc.), and the user presses play to start playing the playlist, the playlist may play through the content programs on the playlist. For example, the user may create the playlist comprising ten content programs on the STB. While viewing the playlist's content programs, the user may decide to stop playing the playlist in the middle of the third content program in the playlist. Two days later, for example, the user may decide to continue watching the playlist from the PC or mobile device. When the user presses play for the playlist at the latter time, the content may start from the place where it was stopped two days earlier (e.g. in the middle of the third content program in the playlist).

The user may access the playlist from the STB, PC, or mobile device and the playlist bookmark may follow the playlist depending on where the user decides to watch. In other words, if the user stops playing a content program from the playlist on a first STB and decides to continue watching from a second STB (PC or mobile device), embodiments of the invention may allow the user to watch from the same time stamp or point that the user had stopped previously within the playlist.

FIG. 1 is a block diagram of a content delivery system 100. Consistent with embodiments of the present invention, system 100 may comprise an edge network 110, an edge quadrature amplitude modulation (QAM) device 115, a video-on-demand (VOD) server 120, a list processor 125, a broadcast server 130, a modular cable modem termination system (M-CMTS) core 135, and a core network 140. In addition, system 100 may comprise, a hybrid fiber-coax (HFC) network 145, a set-top-box (STB) 150, a digital video recorder (DVR) 152, a television (TV) 155, a cable modem (CM) 160, a portable device 165, a personal computer (PC) 170, and a STB control device 175. List processor 125 will be discussed in greater detail below with respect to FIG. 2.

Edge network 110 may comprise, a network providing, for example, full-duplex, two-way broadband services including broadband video and audio, cable television services, or telecommunications services. Edge network 110 may provide data by utilizing network data formats including, for example, i) Internet protocol (IP); ii) Ethernet; iii) digital subscriber line (DSL); iv) asynchronous transfer mode (ATM); and v) virtual private network (VPN). Edge network 110 may utilize managed network services. Edge network 110 may comprise various components including, for example, i) servers; ii) switches; iii) routers; iv) gateways; v) hubs; vi) fiber optic cable; vii) copper cable; and viii) terminations. The aforementioned are examples and edge network 110 may comprise other configurations for broadband service delivery and data switching over system 100.

Edge QAM 115 may provide modulation for various encoding formats (e.g. for data, audio, and video) and may distribute the signal down multiple broadband channels. Edge QAM 115 may modulate signals in, for example, multi-channel quadrature amplitude modulation. Edge QAM 115 may support broadcast and narrowcast with multi-program transport stream (MPTS) pass-through and single-program transport stream (SPTS) to MPTS multiplexing. Edge QAM 115 may meet data-over-cable service interface specification (DOCSIS) and downstream radio frequency interface (DRFI) performance specifications. Furthermore, edge QAM 115 may provide video over internet protocol and moving pictures expert group (MPEG) video simultaneously. Edge QAM 115 may provide various data switching functions and enable two-way, full-duplex communication within the broadband network. Edge QAM 115 may modulate and distribute broadcast multimedia services including, for example, i) a broadcast multi-media service; ii) a high-definition multimedia service; iii) a digital television multimedia service; iv) an analog multimedia service; v) a VOD service; vi) a streaming video service; vii) a multimedia messaging service; viii) a voice-over-internet protocol service (VoIP); ix) an interactive multimedia service; and x) an e-mail service. The aforementioned are examples and edge QAM 115 may comprise other configurations for different broadband and data services.

VOD server 120 may perform processes for providing video entertainment on demand. VOD server 120 may take MPEG compressed video off a hard disk or a networked service, format it into MPEG-TS packets inside a user datagram protocol (UDP) packet, and send it into edge network 110. Edge QAM 115 may receive the UDP packets, where Internet protocol (IP) encapsulation may be removed. The MPEG packets may be forwarded down one QAM channel on edge QAM 115 and onto HFC network 145.

Broadcast server 130 may perform processes for providing broadcast services. Broadcast server 130 may use a broadcast signal and a narrowcast signal to deliver broadcast services to a broadcast system. Broadcast server 130 may receive video, audio, and data from fiber optic input, wireless input, recorded tape, recorded digital video disc, or satellite input. Broadcast server 130 may utilize digital signal formats and analog signal formats. Furthermore, broadcast server 130 may comprise a specialized receiver and data switching equipment for broadband distribution. In addition, broadcast server 130 may provide broadband multimedia services including, for example, i) the broadcast multi-media service; ii) the high-definition multimedia service; iii) the digital television multimedia service; iv) the analog multimedia service; v) the VOD service; vi) the streaming video service; vii) the multimedia messaging service; viii) the voice-over-internet protocol service (VoIP); ix) the interactive multimedia service; and x) the e-mail service. The aforementioned are examples and broadcast server 130 may comprise other components and systems for providing broadcast services in system 100.

M-CMTS core 135 may receive IP datagrams from core network 140. M-CMTS core 135 may then forward these IP datagrams to either a single QAM channel within edge QAM 115 with traditional DOCSIS encapsulation, or may forward the IP datagrams to multiple QAM channels within edge QAM 115, for example, using DOCSIS bonding. M-CMTS core 135 may support DOCSIS features and end-to-end IP within a next generation network architecture (NGNA), for example.

Core network 140 may comprise any data or broadband network that may provide data and services to edge network 110, list processor 125, broadcast server 130, or M-CMTS core 135. For example, core network 140 may comprise the Internet. In addition, core network 140 may comprise various components including, for example, i) servers; ii) switches; iii) routers; iv) gateways; v) hubs; vi) fiber optic cable; vii) copper cable; and viii) terminations. The aforementioned are examples and core network 140 may comprise other components and may supply other services using various other formats.

HFC network 145 may comprise a communications network (e.g. a cable TV network) that uses optical fiber, coaxial cable, or an optical fiber coaxial cable combination. Fiber in HFC network 120 may provide a high-speed backbone for broadband services. Coaxial cable may connect end users in HFC network 120 to the backbone. Such networks may use, for example, matching DOCSIS cable modems at a head end and at an end user's premises. Such a configuration may provide bi-directional paths and Internet access.

STB 150 may comprise a single component or a multi-component system for receiving broadband services. STB 150 may comprise a service consumer system combining several components including, for example, a set top box, cable modem 160, a network interface unit, a residential gateway, a terminal unit, a scrambler/descrambler, a digital storage media unit, an input/output port, a display device, a keyboard, and a mouse. STB 150 may encode and decode digital and analog signals, and provide interface capability for other components. STB 150 may utilize various operating systems and other software components. The end user's premises may contain STB 150. STB 150 may include all the functionality provided by a cable modem, such as CM 160, in one component and attach to TV 155, for example.

DVR 152 may be used in conjunction with STB 150. DVR 152 may record video in a digital format to a disk drive, USB flash drive, memory card, or other memory medium within DVR 152.

TV 155 may comprise an end use device for displaying delivered broadband services. TV 155 may comprise, for example, a television, a high definition television (HDTV), a liquid crystal display unit (LCD), a video projection unit, or PC 170. The aforementioned are examples and TV 155 may comprise other display devices for delivered broadband services.

CM 160 may comprise, for example, a cable modem, a network server, a wireless fidelity data switch, or an Ethernet switch. CM 160 may provide data services to the user by accessing DOCSIS services from system 100. CM 160 may provide Internet access, video, or telephone services. The aforementioned are examples and CM 160 may comprise other data delivery devices.

Portable device 165 or PC 170 may comprise any personal computer, network switch, wireless switch, network hub, server, personal digital assistant, mobile telephone, mobile device, notebook computer, and home computing device. Portable device 165 or PC 170 may serve as user devices for data access from system 100. Portable device 165 and PC 170 may transmit and receive data and services from system 100. Portable device 165 or PC 170 may record video in a digital format to a disk drive, USB flash drive, memory card, or other memory medium within portable device 165 or PC 170.

STB control device 175 may comprise any input and output device for interfacing with STB 150 or TV 155. For example, STB control device 175 may be a remote control for using STB 150. STB control device 175, after proper programming, may interface with STB 150.

Embodiments consistent with the invention may comprise a system for providing play list bookmarking. The system may comprise a first memory storage and a first processing unit coupled to the memory storage. The first processing unit may be operative to display a content program from a playlist, pause the content program in response to a first user input, and place a time stamp in the playlist at a point where the content program was paused. The first processing unit may also be operative to transmit the time stamped playlist to a server. The system may further comprise a second memory storage and a second processing unit coupled to the memory storage. The second processing unit may be operative to receive the time stamped playlist from the server, and display, in response to a second user input, the content program from the playlist from the point in the content program corresponding to the time stamp.

Consistent with embodiments of the present invention, the aforementioned memories, processing units, and other components may be implemented in a content delivery system, such as system 100 of FIG. 1. Any suitable combination of hardware, software, and/or firmware may be used to implement the memories, processing units, or other components. By way of example, the memories, processing units, or other components may be implemented with list processor 125 or user devices such, but not limited to, STB 150, DVR 152, TV 155, CM 160, PC 170, and portable device 165, in combination with system 100. The aforementioned system and processors are examples and other systems and processors may comprise the aforementioned memories, processing units, or other components, consistent with embodiments of the present invention.

Figure 2:
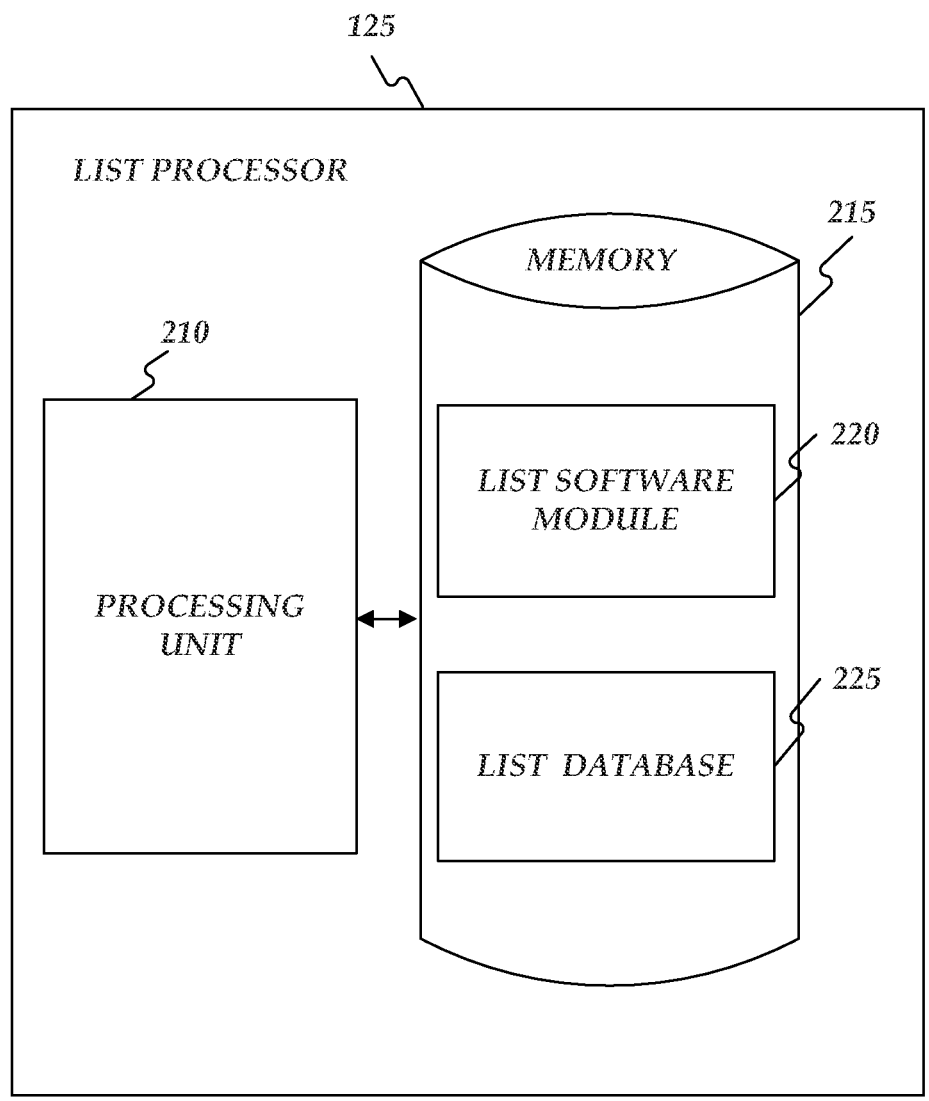
FIG. 2 is a block diagram of the list processor.

FIG. 2 shows list processor 125 of FIG. 1 in more detail. As shown in FIG. 2, list processor 125 may include a processing unit 210 and a memory unit 215. Memory 215 may include a list software module 220 and a list database 225. While executing on processing unit 210, list software module 220 may perform processes for providing play list bookmarking, in conjunction with, for example, one or more stages included in method 300 described below with respect to FIG. 3. Furthermore, list software module 220 and list database 225 may be executed on or reside in any element shown in FIG. 1. Moreover, any one or more of the stages included in method 300 may be performed on any element shown in FIG. 1 including, but not limited to, STB 150, DVR 152, TV 155, CM 160, PC 170, or portable device 165. Set-top-box (STB) 150, DVR 152, and television (TV) 155 may function together as one user device.

List processor 125 ("the processor") may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 3:
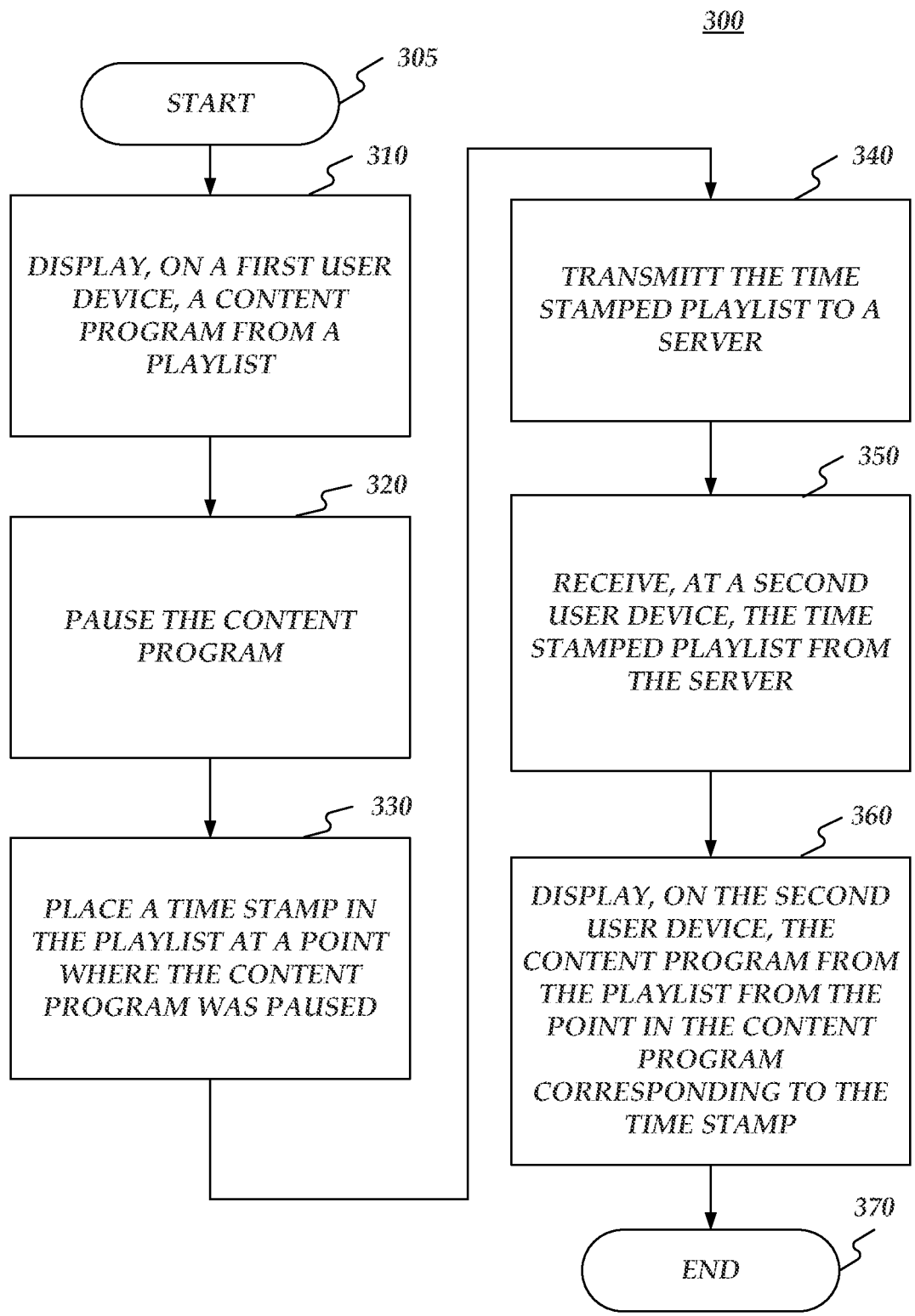
FIG. 3 is a flow chart of a method for providing playlist bookmarking.

FIG. 3 is a flow chart setting forth the general stages involved in a method 300 consistent with an embodiment of the invention for providing playlist bookmarking. Method 300 may be implemented using, for example, a STB 150 as described in more detail above with respect to FIG. 1. Embodiments of the invention may be implemented using devices other than and in addition to STB 150 including, but not limited to, CM 160, portable device 165, PC 170, list processor 125, or VOD server 120, for example. Ways to implement the stages of method 300 will be described in greater detail below.

Method 300 may begin at starting block 305 and proceed to stage 310 where a content program from a playlist may be displayed on a first user device. For example, a user may maintain the playlist on DVR 152 or STB 150. The user may use STB control device 175 to press "play" to start playing the playlist on television (TV) 155 (e.g. the first user device.) The playlist may play through the content programs on the playlist. For example, the playlist may comprise, but is not limited to, ten content programs. The ones of the content programs corresponding to the playlist may be stored on DVR 152 or anywhere on system 100. Moreover, the ones of the content programs corresponding to the playlist may come from VOD server 120, for example.

From stage 310, where the content program is displayed on the first user device, method 300 may advance to stage 320 where the content program may be paused (or stopped) on the first user device. While viewing the playlist's content programs, the user may decide to stop playing the playlist in the middle of the third content program in the playlist. For example, the user may use STB control device 175 to press "pause" or "stop" to pause or stop playing the playlist on television (TV) 155.

Once the content program is paused (or stopped) on the first user device in stage 320, method 300 may continue to stage 330 where the first user device may place a time stamp in the playlist at a point where the content program was paused or stopped. For example, in response to the user using STB control device 175 to pause or stop playing the playlist, DVR 152 or STB 150 may place a time stamp (e.g. bookmark) in the playlist. In other words, if the user decides, for example, to pause or stop playing the playlist at 54 min. and 32 sec. into the third content program in the playlist, DVR 152 or STB 150 may place the time stamp in the playlist at 54 min. and 32 sec. into the third content program.

After the first user device places the time stamp in the playlist in stage 330, method 300 may proceed to stage 340 where the time stamped playlist may be transmitted to list server 125. For example, in order to allow for the time stamped playlist to be synchronized with other user devices, the time stamped playlist may be stored in a place accessible by other user devices. Consequently, the time stamped playlist may be transmitted to and saved on list server 125 where it may be accessed by other user devices.

From stage 340, where the time stamped playlist is transmitted to list server 125, method 300 may advance to stage 350 where a second user device may receive the time stamped playlist from list server 125. For example, in order to allow for the time stamped playlist to be synchronized with the second user device, the time stamped playlist from the first user device may be stored in a place (e.g. list server 125) accessible by the second user device. Consequently, the time stamped playlist may be transmitted from list server 125 to the second user device. The second user device may comprise, but is not limited to, STB 150, DVR 152, TV 155, CM 160, PC 170, or portable device 165. The time stamped playlist may be transmitted across the different devices when the user tries to access the playlist from the second user device. In other words, the bookmark may be updated when the user tries to watch programs from the playlist instead of, for example, updating the bookmarks to the second user device on a regular basis.

Once the second user device receives the time stamped playlist in stage 350, method 300 may continue to stage 360 where the content program may be displayed by the second user device from the playlist from the point in the content program corresponding to the time stamp. For example, after the user stops playing the playlist in the third content program in the playlist (stage 320), at a latter time, the user may decide to continue watching the playlist from the second user device (e.g. PC 170 or mobile device 165.) When the user presses "play" for the playlist at the second user device, the content program may start from the place where it was stopped earlier (e.g. at 54 min. and 32 sec. into the third content program of the playlist.) In other words, the second user device may start playing the playlist at the time stamp in the playlist. In addition, the content program may be rewound or fast forwarded on the second device from the point in the content program corresponding to the time stamp in response to user input.

Content programs corresponding to the playlist may be stored on the second user device or anywhere on system 100. Moreover, the content programs corresponding to the playlist may come from VOD server 120, for example. Once the content program is displayed by the second user device in stage 360, method 300 may then end at stage 370.

As stated above, in order to allow for the time stamped playlist to be synchronized with other user devices, the time stamped playlist may be stored in a place accessible by other user devices. Consistent with embodiments of the invention, the time stamped playlist may be synchronized between user devices without having to store the time stamped playlist on list server 125. For example, the most recent time stamped playlist may be synchronized directly between user devices over wired or wireless (e.g. Wi-Fi, Bluetooth, etc.) connections between the user devices. In other words, the time stamped playlist may be transmitted to a second user device directly over a local wired or wireless network (e.g. a home Wi-Fi network, Bluetooth, etc.) from a first user device. The first user device may comprise STB 150 or DVR 152, for example, and the second user device may comprise a mobile device (e.g. portable device 165).

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing play list bookmarking, the method comprising:
   displaying, on a first user device, a content program from a playlist, wherein displaying, on the first user device, the content program comprises displaying, on the first user device, the content program saved on the first user device;
   pausing a display of the content program;
   placing a time stamp in the playlist at a point where the display of the content program was paused;
   transmitting the time stamped playlist to a second user device from the first user device, wherein the time stamped playlist is transmitted from the first user device to the second user device without being transmitted through an intermediary device, over at least one of the following: a local wired network and a wireless network;
   synchronizing a local playlist at a the second user device with the time stamped playlist received from the first user device, wherein synchronizing the local playlist comprises synchronizing in response to a request from a user to continue display of the content program on the second user device; and displaying, on the second user device, the content program from the synchronized playlist from the point in the content program corresponding to the time stamp, wherein displaying, on the second user device, the content program comprises:
    displaying, on the second user device, the content program saved on the second user device.

2. The method of claim 1, wherein displaying, on the first user device, the content program from the playlist comprises displaying, on the first user device comprising one of the following: a mobile device, a personal computer, and a television in conjunction with a set-top box and digital video recorder.

3. The method of claim 1, wherein displaying, on the first user device, the content program comprises displaying, on the first user device, the content program comprising a video on demand program received from a video on demand server.

4. The method of claim 1, wherein displaying, on the second user device, the content program from the playlist comprises displaying, on the second user device comprising one of the following: a mobile device, a personal computer, and a television in conjunction with a set-top box and digital video recorder.

5. The method of claim 1, wherein displaying, on the second user device, the content program comprises displaying, on the second user device, the content program comprising a video on demand program received from a video on demand server.

6. The method of claim 1, wherein pausing the content program comprises pausing the content program in response to user input received at the first user device.

7. The method of claim 1, wherein displaying, on the second user device, the content program comprises displaying, on the second user device, the content program in response to user input received at the second user device.

8. The method of claim 1, further comprising, after displaying, on the second user device, the content program from the playlist from the point in the content program corresponding to the time stamp, rewinding the content program from the point in the content program corresponding to the time stamp in response to user input.

9. The method of claim 1, further comprising, after displaying, on the second user device, the content program from the playlist from the point in the content program corresponding to the time stamp, fast forwarding the content program from the point in the content program corresponding to the time stamp in response to user input.

10. The method of claim 1, wherein synchronizing the local playlist on the second user device comprises synchronizing the local playlist on the second user device on a regular basis with the time stamped playlist on a server.

11. The method of claim 1, further comprising:
    updating the local playlist in response to continuance of display of the content program on the second device; and
    synchronizing the time stamped playlist on a server with the local playlist of the second user device on a regular basis.

12. A system for providing play list bookmarking, the system comprising:
    a first user device comprising:
        a first memory storage, and
        a first processing unit coupled to the first memory storage, wherein the first processing unit is operative to:
            display a content program from a playlist on a first device, wherein the first processing unit being operative to display the content program saved on the first device,
            stop the display of the content program in response to a first input from a user,
            place a time stamp in the playlist at a point where the display of the content program was stopped, and
            transmit the time stamped playlist to a second user device, wherein the time stamped playlist is transmitted from the first user device to the second user device without being transmitted through an intermediary device, over at least one of the following: a wired network and a wireless network; and
    the second user device comprising:
        a second memory storage; and
        a second processing unit coupled to the second memory storage, wherein the second processing unit is operative to:
            receive the time stamped playlist from the first user device in response to a request from the user to continue the display of the content program on a second user device,
            synchronize a local playlist on the second user device with the received time stamped playlist, and
            display, in response to a second user input, the content program from the synchronized playlist from the point in the content program corresponding to the time stamp, wherein the second processing unit being operative to display the content program saved on the second user device.

13. The system of claim 12, wherein the first user device comprises one of the following: a mobile device, a personal computer, a television, a set-top box, and digital video recorder.

14. The system of claim 12, wherein the first processing unit being operative to display the content program comprises the first processing unit being operative to display the content program comprising a video on demand program received from a video on demand server.

15. The system of claim 12, wherein the second user device comprises one of the following: a mobile device, a personal computer, a television, a set-top box, and digital video recorder.

16. The system of claim 12, wherein the second processing unit being operative to display the content program comprises the second processing unit being operative to display the content program comprising a video on demand program received from a video on demand server.

17. The system of claim 12, wherein the second processing unit is further operative to, after displaying the content program from the playlist from the point in the content program corresponding to the time stamp, one of rewind and fast forward the content program from the point in the content program corresponding to the time stamp.

18. A computer-readable storage device that stores a set of instructions which when executed perform a method for providing play list bookmarking, the method executed by the set of instructions comprising:
    generating a time stamped playlist on a first user device, the time stamped playlist comprising a time stamp in the time stamped playlist at a point where a content program in the time stamped playlist was one of the following: stopped by a user viewing the content program and paused by the user viewing the content program, wherein the content program is saved on the first user device; and
    transmitting the time stamped playlist to a second user device from the first user device, wherein the time stamped playlist is transmitted from the first user device to the second user device without being transmitted through an intermediary device, over at least one of the following: a wired network and a wireless network, in response to a user request to continue a display of the content program on the second user device, wherein the second user device is configured to display the content program saved on the second user device, and wherein the second user device is further configured to:

receive the time stamped playlist, synchronize a local playlist on the second user device with the received time stamped playlist, and display the content program from the point of the time stamp, wherein displaying the content program from the point of the time stamp comprises at least one of: a rewinding of the content program from the point in the content program corresponding to the time stamp, and a fast forwarding of the content program from the point in the content program corresponding to the time stamp.

* * * * *